(12) United States Patent
Marek et al.

(10) Patent No.: US 6,192,749 B1
(45) Date of Patent: *Feb. 27, 2001

(54) MASS FLOW SENSOR WITH RUPTURE DETECTION

(75) Inventors: Jiri Marek, Reutlingen; Wolfgang Mueller, Stuttgart, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,863

(22) Filed: Aug. 12, 1998

(30) Foreign Application Priority Data

Aug. 16, 1997 (DE) .............................. 197 35 666

(51) Int. Cl.$^7$ ....................................... G01F 1/68
(52) U.S. Cl. ..................................... 73/204.26
(58) Field of Search ..................... 73/204.26, 204.11, 73/204.17, 204.18, 204.19, 204.22, 204.23, 204.25, 204.27, 118.2, 514.38, 83, 82, 87

(56) References Cited

U.S. PATENT DOCUMENTS

| 4,888,988 | | 12/1989 | Lee et al. ...................... 73/204.26 |
|---|---|---|---|
| 4,951,510 | * | 8/1990 | Holm-Kennedy et al. ....... 73/514.33 |
| 5,237,867 | * | 8/1993 | Cook, Jr. ........................ 73/204.15 |
| 5,321,983 | * | 6/1994 | Nagata ........................... 73/204.18 |
| 5,765,432 | * | 6/1998 | Lock et al. ..................... 73/204.11 |
| 5,936,157 | * | 8/1999 | Yamashita ...................... 73/204.26 |

* cited by examiner

*Primary Examiner*—Benjamin R. Fuller
*Assistant Examiner*—Jagdish Patel
(74) *Attorney, Agent, or Firm*—Kenyon & Kenyon

(57) ABSTRACT

A mass flow sensor having a thin substrate and a resistor element arranged on the thin substrate. The thin substrate is stretched on a fixed substrate. In a stretched area, at which, in response to mechanical loading of the thin substrate, the mechanical stresses concentrate, a resistor element for detecting ruptures is arranged. As a result of a rupture in the stretched area, this rupture-detection resistor is interrupted, and the rupture can be confirmed due to the sudden increase in the resistance of the resistor, caused thereby.

9 Claims, 1 Drawing Sheet

MASS FLOW SENSOR WITH RUPTURE DETECTION

FIELD OF THE INVENTION

The present invention relates to a mass flow sensor.

BACKGROUND OF THE INVENTION

U.S. Pat. No. 4,888,988 describes a mass flow sensor which has a thin substrate on which a resistor element is arranged. The thin substrate is secured on a thick, mechanically fixed substrate. The thin substrate is configured as an electrical diaphragm, which is secured on a thick substrate made of silicon. A plurality of resistor elements are arranged on the diaphragm, but none of these resistor elements is arranged such that a rupture of the diaphragm in the stretched area could be detected.

SUMMARY OF THE INVENTION

In contrast, the mass flow sensor according to the present invention is capable of reliably detecting a rupture of the diaphragm in the stretched area of the thin substrate. Therefore, a mass flow sensor according to the present invention is capable of being diagnosed by determining whether the thin substrate, on which the resistor element is arranged, is still mechanically intact. The mass flow sensor according to the present invention can thus also be used in an environment where safety is critical, for example, in the intake manifold of an automobile.

By arranging the resistor for rupture detection in the area of great mechanical stresses, it is assured that a rupture will be immediately detected, since a rupture will develop first at these locations. In the case of an elongated stretched area, a resistor of this type for detecting a rupture is preferably arranged perpendicularly to the longitudinal direction. It is advantageous to configure the resistor for rupture detection as a thin-film resistor, preferably made of the same material as the resistor element. It is advantageous if the resistor for rupture detection and the resistor element can be configured from the same layer of material. Particularly suitable for the thin substrate are silicon oxide, silicon nitride, or a combination of these two materials, particularly if the mechanically fixed substrate is made of silicon. An example relates to a rectangular diaphragm, which is stretched on all sides by a frame-shaped fixed substrate. The resistor for rupture detection is then constituted as a meander-shaped resistor on the longitudinal sides or as a meander-shaped resistor surrounding three sides of the rectangular diaphragm.

DETAILED DESCRIPTION

Figure 1:
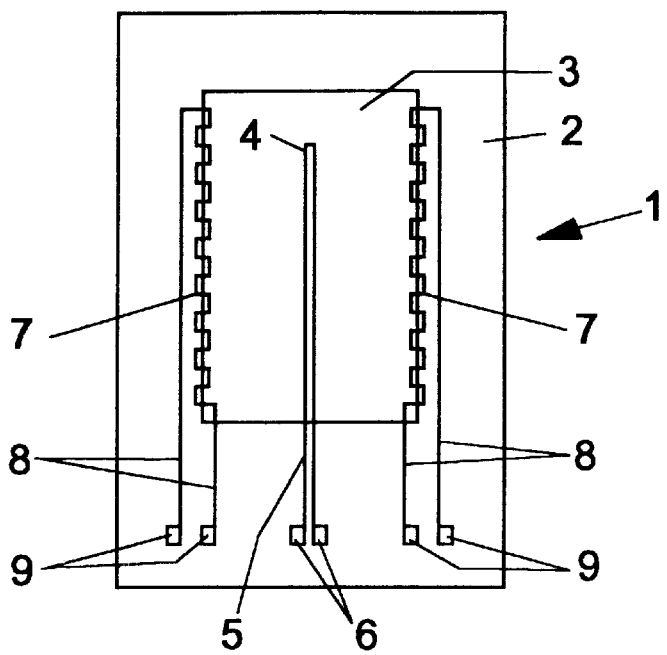
FIG. 1 shows a first view of a mass flow sensor according to the present invention.

FIG. 1 depicts a mass flow sensor 1 having a frame 2 made of single-crystalline silicon and a dielectric diaphragm 3, stretched thereon. Arranged on dielectric diaphragm 3 is a resistor element 4 which is connected via printed circuit traces 5 to connecting points 6 on frame 2. An arrangement of this type corresponds to the arrangement, already known, according to U.S. Pat. No. 4,888,988. By applying an electrical voltage between the two connecting points 6, a current flow is conducted via printed circuit traces 5 through resistor element 4. This current flow heats resistor element 4 and thus also diaphragm 3. Diaphragm 3 is cooled by a quantity of air flowing by, this cooling being verifiable by measuring the resistance of resistor element 4. As is the case in U.S. Pat. No. 4,888,988, further temperature measuring elements, which are also configured as resistor elements, can be arranged on diaphragm 3. As has already been described in U.S. Pat. No. 4,888,988, a thin layer, preferably of silicon oxide, silicon nitride, or a combination of these two materials, is applied on a plate-shaped silicon substrate for fabrication purposes. On this layer for the diaphragm 3, a metal layer for resistor element 4 is then deposited over the entire surface. Through patterning, resistor element 4 is then delineated out of the metal layer. Subsequently, further covering layers can be applied.

To maintain the thermal dissipation of resistor element 4 at a low level, diaphragm 3 is designed to be very thin, typically on the order of magnitude of less than one micrometer. In contrast, frame 2 is comparatively fixed mechanically. Thin diaphragm 3 is usually stretched over an area that is many times greater than the thickness of diaphragm 3. When a pressure differential arises on the upper and lower sides of diaphragm 3, powerful mechanical stresses can arise in diaphragm 3. These can lead to a fissure or a rupture in diaphragm 3. Given the rectangular shape of diaphragm 3, depicted here, a rupture of this type occurs as a rule on the longitudinal sides of the rectangular diaphragm in the immediate vicinity of the mechanically fixed frame 2. In this area, hereinafter designated as the stretched area, the greatest mechanical stresses occur, so that fissures or ruptures more often form at these locations first. Fissures or ruptures of this type can destroy diaphragm 3 or, since diaphragm 3 in the rupture areas is no longer thermally joined to frame 2, can lead to only an altered heat dissipation response of diaphragm 3. It is thus desirable to determine for a mass flow sensor whether a rupture or a fissure has occurred in diaphragm 3. According to the present invention, for this purpose, in the stretched areas, i.e., in the areas in which the greatest mechanical stresses occur, resistors 7 for detecting ruptures are arranged. These resistors for rupture detection 7 are connected via printed circuit traces 8 to connecting areas 9 on frame 2. The resistors for rupture detection 7 are constituted here as meander-shaped resistors 7, which repeatedly traverse in a perpendicular direction the stretched area, which here is designed as an elongated strip. Assurance is thus provided that even a small, short rupture in diaphragm 3 will be reliably and confidently detected since at least one of the meanders of rupture detection resistors 7 will be interrupted. In a measurement of the resistance between connecting areas 9, therefore, a sudden rise in resistance would be noticed, which is a reliable indication of a rupture in diaphragm 3.

Rupture-detection resistors 7 are preferably made of the same material as resistor element 4. The advantage of this is that resistor element 4 as well as rupture-detection resistors 7 can be pattern-molded from one and the same layer. Furthermore, printed circuit traces 8, 5 and connecting areas 6, 9 can, of course, be formed from the same layer.

Figure 3:
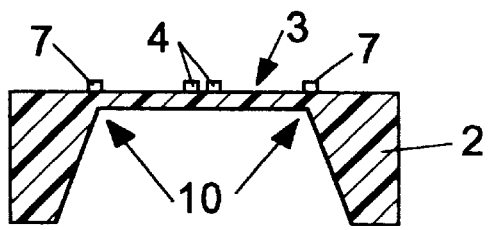
FIG. 3 shows a cross-section of the mass flow sensor according to the present invention.

In addition, FIG. 3 depicts a cross section of the mass flow sensor according to FIG. 1. In FIG. 3, a cross section of frame 2, diaphragm 3, resistor element 4, and rupture-detection resistors 7 are depicted. As can be seen in the cross section, in each transitional area between diaphragm 3 and frame 2, a sharp corner 10 forms, leading to a notch effect and thus to the increased occurrence of mechanical stresses in the stretched areas. Therefore, in response to mechanical loading of diaphragm 3, to the extent that the loading is not lumped or that diaphragm 3 is weakened at any point, a fissure or rupture will usually occur, usually arising in the vicinity of these sharp corners 10. It is precisely these areas that are repeatedly crossed by rupture-detection resistors 7, which are given a meandering design so that it is assured that in response to a fissure or rupture of the diaphragm 3, a partial segment of resistors 7 will, without fail, be mechanically interrupted, and as a result, the electrical resistance of resistors 7 will rise sharply.

The present invention, of course, is not limited to use with diaphragms, but rather may be used whenever a thin substrate is secured on a mechanically fixed substrate. The area susceptible to rupture is thus always the stretched area, i.e., the area at which the mechanically fixed substrate changes over into the thin substrate. Through the arrangement of the corresponding rupture-detection resistors, ruptures can generally be detected in these areas.

Figure 2:
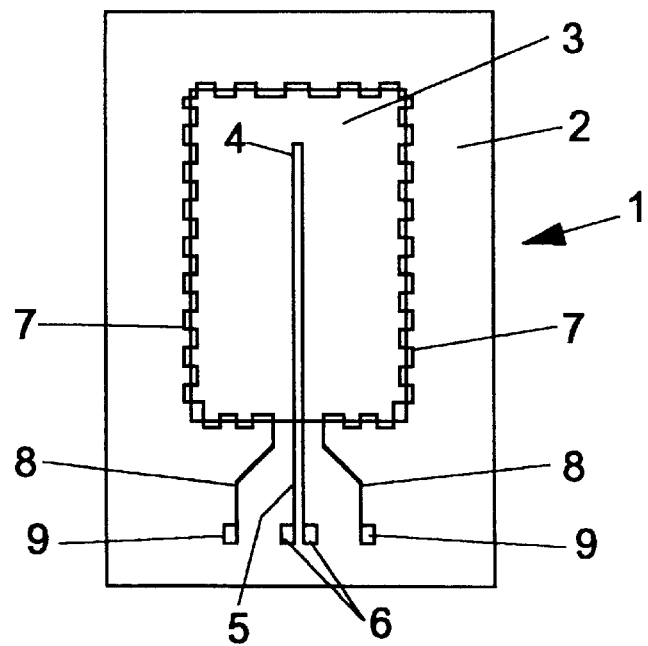
FIG. 2 shows a second view of the mass flow sensor according to the present invention.

FIG. 2 depicts a further exemplary embodiment of the present invention. Here again a mass flow sensor 1 is depicted which has a frame 2 of single-crystalline silicon, on which a diaphragm 3 of dielectric material is stretched. A resistance element 4 is again arranged on diaphragm 3. In contrast to FIG. 1, however, no provision is made for two rupture-detection resistors 7, but rather for a single resistor 7. But the single resistor 7 extends essentially across the entire stretched area, i.e., it encircles diaphragm 3 nearly totally (on at least three sides). The only area left free is that in which the printed circuit traces 6 are arranged for contacting resistor element 4. With an arrangement of this type, virtually the entire stretched area of diaphragm 3 can be monitored for ruptures using a single resistor 7.

What is claimed is:

1. A mass flow sensor, comprising:
   a thick mechanically fixed substrate;
   a thin substrate having a slight thermal conductivity and secured on the mechanically fixed substrate, the thin substrate being joined to the mechanically fixed substrate along a stretched area of the thin substrate, the stretched area of the thin substrate being an area of the thin substrate immediately adjacent to the mechanically fixed substrate and corresponding to a border region between the thin substrate and the mechanically fixed substrate;
   a first resistor arranged on the thin substrate; and
   a second resistor provided on the border region, the second resistor detecting a rupture of the border region, the second resistor being interrupted in response to a rupture of the thin substrate.

2. The mass flow sensor according to claim 1, wherein the second resistor is arranged at a location in the stretched area where a predetermined amount of mechanical stress arises in response to a mechanical loading of the thin substrate.

3. The mass flow sensor according to claim 1, wherein the stretched area is elongated in shape, and wherein at least a portion of the second resistor extends essentially perpendicularly to a longitudinal direction of the stretched area.

4. The mass flow sensor according to claim 1, wherein the second resistor includes a thin-film resistor.

5. The mass flow sensor according to claim 1, wherein the first resistor includes a thin-film element, and wherein each one of the first resistor and the second resistor is formed of a predetermined material.

6. The mass flow sensor according to claim 1, wherein the thin substrate includes a diaphragm formed of one of silicon oxide, silicon nitride, and a combination of silicon oxide and silicon nitride, and wherein the mechanically fixed substrate includes silicon.

7. The mass flow sensor according to claim 6, wherein the diaphragm is rectangular in shape and includes a plurality of longitudinal sides, and wherein the second resistor extends according to a meander-shaped configuration on the longitudinal sides of the diaphragm.

8. The mass flow sensor according to claim 6, wherein the diaphragm is rectangular in shape, and wherein the second resistor includes a meander-shaped configuration arranged on at least three sides of the diaphragm.

9. The mass flow sensor according to claim 1, wherein the second resistor extends according to a meander-shaped configuration and repeatedly traverses the stretched area.

* * * * *